Nov. 13, 1956  E. D. DRESSEL  2,770,180
ROTARY ROW WEEDING RAKE AND CRUST BREAKER
Filed July 29, 1954  3 Sheets—Sheet 1
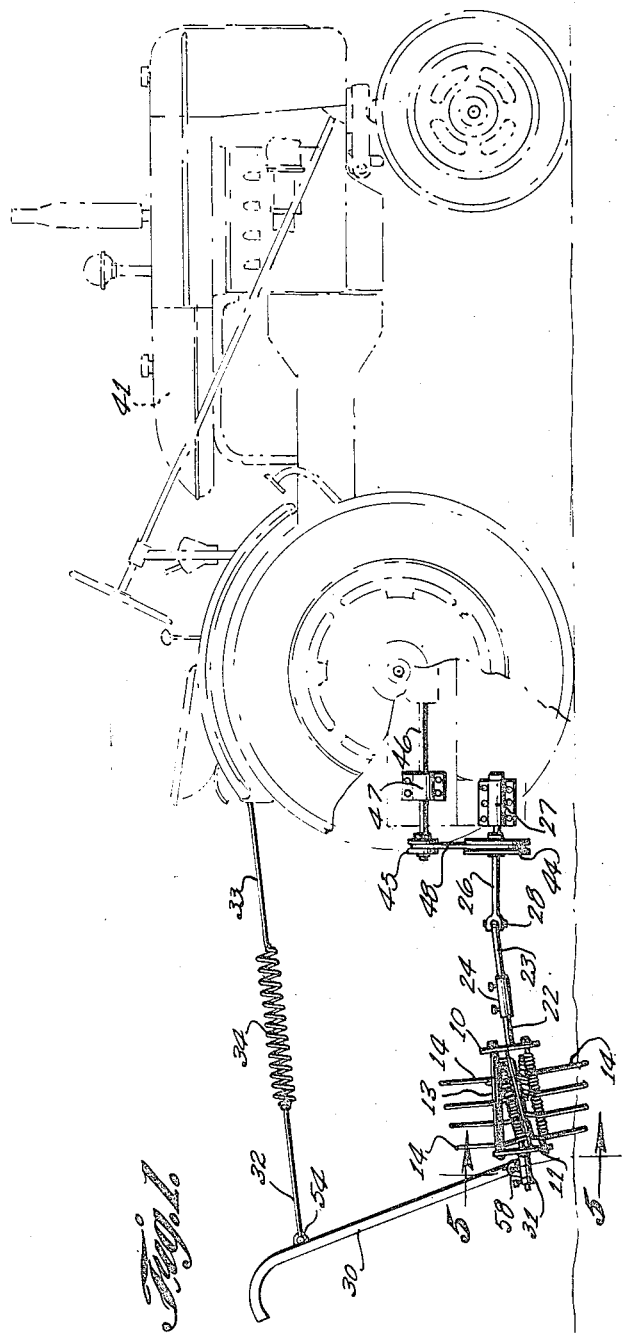
INVENTOR.
Elvin D. Dressel
BY Victor J. Evans & Co.
ATTORNEYS

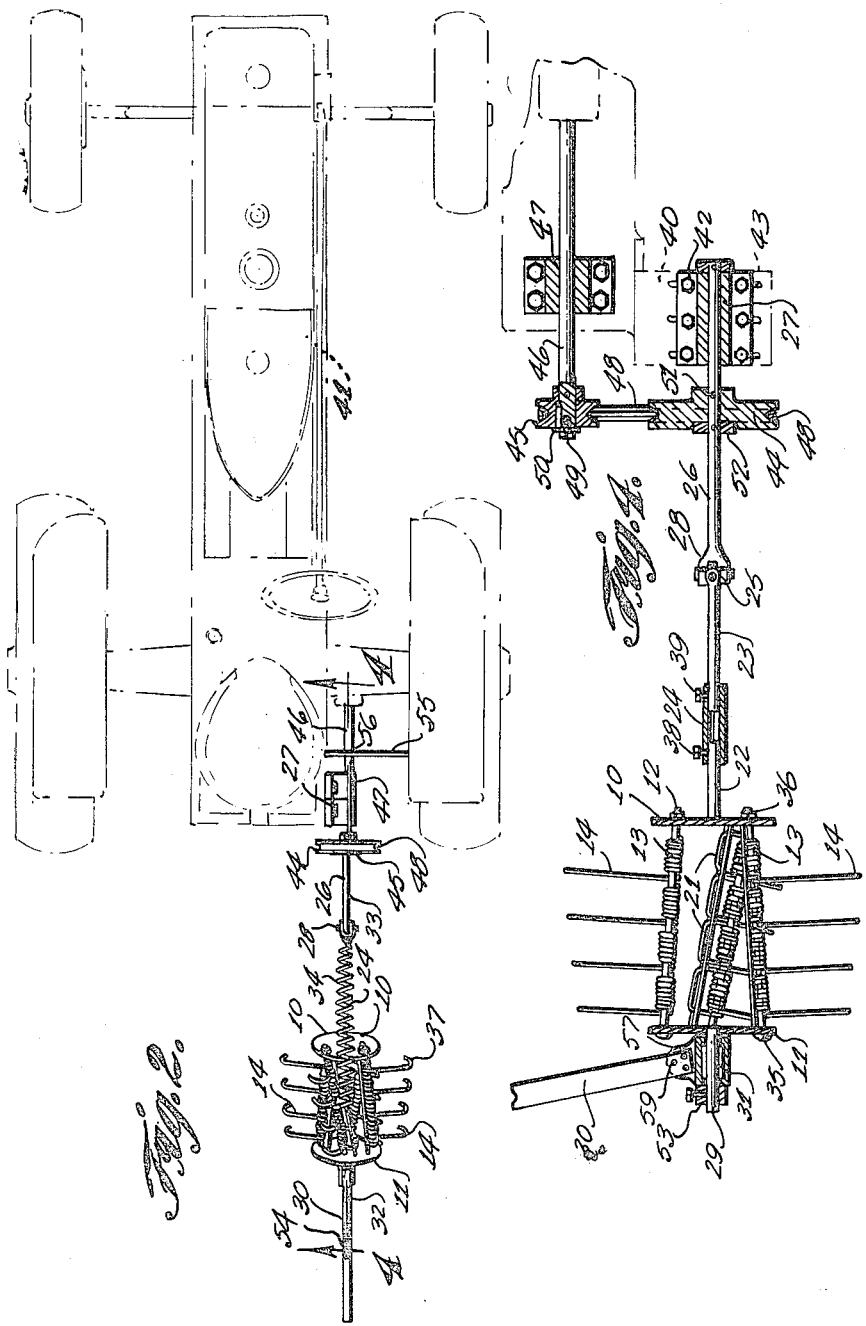

Nov. 13, 1956  E. D. DRESSEL  2,770,180
ROTARY ROW WEEDING RAKE AND CRUST BREAKER
Filed July 29, 1954  3 Sheets-Sheet 3
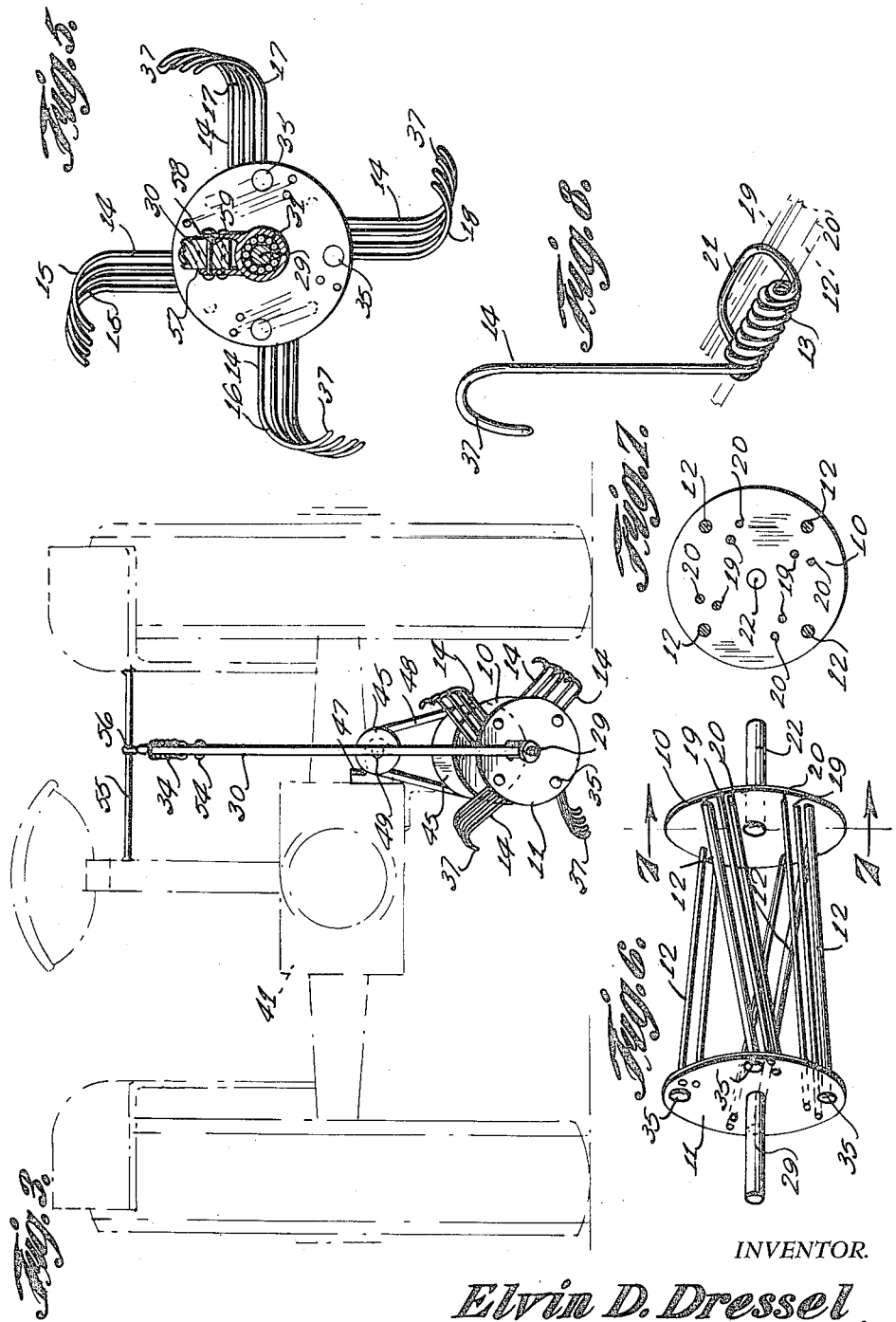
INVENTOR.
Elvin D. Dressel
BY Victor J. Evans &co.
ATTORNEYS

United States Patent Office 2,770,180
Patented Nov. 13, 1956

2,770,180

ROTARY ROW WEEDING RAKE AND CRUST BREAKER

Elvin D. Dressel, Oakes, N. Dak.

Application July 29, 1954, Serial No. 446,547

2 Claims. (Cl. 97—216)

This invention relates to weeding attachments adapted to be used on tractors wherein rotating prongs remove weeds from rows of plants and break the crust of the soil between the rows, and in particular, an attachment adapted to be mounted on a tractor and connected to the power take-off thereof whereby spaced eccentrically positioned groups of prongs providing forks are rotated about an axis positioned parallel to a row of plants so that the weeds in the rows are removed and the crust of the soil is broken.

The purpose of this invention is to provide a rotary row weeding rake that is adapted to be attached to a tractor and driven by the power take-off thereof in which the device is particularly adapted for weeding rows of plants in a nursery and in which two rows of plants may be weeded at the same time.

With conventional weeding attachments, it is diffcult to pick out small shallow-rooted weeds particularly from small trees or upright unbushed vegetables without damaging the plants and for this reason it is necessary to have workers follow the weeding attachment. With this thought in mind, this invention contemplates a row weeding rake having eccentrically positioned spaced forks with resiliently held tines mounted between discs rotatably mounted on a tractor and having a pulley by which the elements are rotated from the power take-off of a tractor.

The object of this invention is, therefore, to provide means for mounting and operating a row weeding rake in combination with a tractor whereby spaced groups of prongs travel in eccentrically positioned paths along a row of plants over which a tractor to which the device is attached travels.

Another object of the invention is to provide a weeding attachment for a tracor in which groups of prongs or tines work through the soil transversely of the direction of travel with the soil being worked with a churning action so that weeds and the like and particularly shallow-rooted weeds are removed from the rows.

A further object of the invention is to provide a row weeding attachment for a tractor in which eccentrically positioned rotating groups of prongs not only remove weeds from the rows but also break the crust and work the soil around the plants.

A still further object of the invention is to provide a transversely operating rotary row weeding rake adapted to be attached to and operated by a tractor in which the device is of a simple and economical construction.

With these and other objects and advantages in view, the invention embodies groups of resiliently held prongs eccentrically mounted in spaced parallel discs with one of said discs rotatably mounted in the lower end of a handle and with the other disc connected by a universal joint and sections of shafting to the power take-off of a tractor whereby with the tractor moving forwardly along a row of plants the prongs rotate across or transversely of the row.

Other features and advantages of the invention will appear from the following description taken in connection with the drawings, wherein:

Figure 1 is a side elevational view illustrating the rotary row weeding rake and crust breaking attachment mounted on a tractor, the tractor being shown in broken lines, a bearing at the lower end of a handle on the trailing end of the device being connected to the tractor with a rod having a spring therein.

Figure 2 is a plan view of the attachment showing the position thereof on a tractor, the tractor also being shown in broken lines.

Figure 3 is a rear elevational view also showing the attachment mounted on a tractor and also showing the tractor in broken lines.

Figure 4 is a side elevational view of the attachment with the parts substantially as shown in Figure 1, the parts being shown on an enlarged scale and parts thereof being broken away and shown in section, the section being taken on line 4—4 of Figure 2.

Figure 5 is a cross section taken on line 5—5 of Figure 1 showing an end elevational view of the raking element with the parts shown on an enlarged scale and with the bearing at the end of the element shown in section.

Figure 6 is a detail showing a perspective view of the eccentrically positioned prong-mounting element carried by the discs.

Figure 7 is a cross section through the rake or prong-carrying element taken on line 7—7 of Figure 6 showing the arrangement of the removable prong-carrying bolts and spring-holding rods.

Figure 8 is a detail showing a perspective view of one of the prongs or tines of the rake elements with the bolt and spring-retaining rods shown in broken lines.

Referring now to the drawings wherein like reference characters denote corresponding parts, the improved rotary row weeding rake and crust breaker of this invention includes spaced parallel discs 10 and 11, bolts 12 for mounting spring hubs or coils 13 of tines 14 of forks or rakes 15, 16, 17 and 18 positioned between the discs, spaced rods 19 and 20 for retaining loops 21 of the coils 13 in such positions that the tines 14 extend radially from the axis of the discs, a stub shaft 22 on which the disc 10 is carried, a rod 23 connected to the shaft 22 with a coupling 24 and having an element 25 of a universal joint on the opposite end, a driving shaft 26 journaled in a bearing 27 and having a bifurcated section 28 of the universal joint of which the part 25 is an element, a stud 29 extended from the disc 11 and rotatably mounted in the lower end of a handle 30 with a bearing 31 and a brace including rods 32 and 33 and a spring 34 for connecting the upper end of the handle to the tractor.

As illustrated in Figures 4 and 6, the bolts 12 are mounted in openings in the discs 10 and 11 and the openings are positioned whereby the bolts are inclined to the longitudinal axis of rotation of the discs.

The bolts 12 are provided with heads 35 which are positioned against the outer surface of the disc 11 and the opposite ends, which are threaded, are provided with nuts 36 that are positioned against the outer surface of the disc 10. A plurality of the coils 13 having tines 14 with hook-like outer ends 37 are positioned on the bolts and loops 21 extended from the coils or hubs 13 extend between the rods 19 and 20 which are spaced from the bolts and positioned parallel thereto. The ends of the rods are secured in the discs, such as by welding or brazing, whereby the device provides a rigid unit. The bolts 12 are removable, thereby providing means for removing the tines for repair and replacement.

With the tines or prongs of the forks or rakes mounted in this manner, the hook-like ends follow irregular paths through the soil so that the device operates with a churning action completely uprooting weeds and particularly weeds with shallow roots. At the same time, the rakes break the crust of the soil and thoroughly work the soil around rows of plants.

The coupling 24 connects the stub shaft 22 to the rod 23 extended from the universal joint and, as illustrated in Figure 4, one end of the coupling is secured to the stub shaft 22 with a set screw 38 and the opposite end is secured to the rod 23 with a similar set screw 39. The bearing 27 in which the shaft 26 is mounted is attached to a bracket 40 of a tractor, as indicated by the numeral 41 with bolts 42 which are positioned in slotted openings 43 whereby the bearing is adapted to be adjusted vertically.

A pulley 44 mounted on the driving shaft 26 is aligned with a pulley 45 on a power take-off shaft 46 of the tractor, the power take-off shaft being mounted in a bearing 47 and the driving shaft 26 being driven by a belt 48, trained over the pulleys 44 and 45. The pulley 45 is secured to the shaft 46 with a cap screw 49 and a key 50 and the pulley 44 is secured to the driving shaft 26 with a pin 51 and a set collar 52.

At the trailing end of the device, the bearing 31 on the lower end of the handle 30 is held on the stud 29 with a set collar 53 and the upper part of the handle 30 is provided with an eye 54 to which the rod 32 extended from the spring 34 is connected, the rod 33 at the opposite end of the spring being connected to a cross bar 55 with an eye 56. The cross bar 55 is secured to parts of the tractor, such as by welding or the like.

The bearing 31, at the trailing end of the rake, is provided with spaced upwardly extended flanges 57 and 58 by which the bearing is secured to the lower end of the handle 30 with bolts 59.

With the parts formed and assembled in this manner, a rotary row weeding rake and crust breaker is provided that is particularly adapted for weeding and working plants in a nursery and with the parts formed and assembled as shown and described two rows of plants may be worked at the same time and it will be understood that as many units may be attached to a tractor as may be desired. The units are readily adjustable as to height and broken or bent tines may readily be removed and replaced.

It will be understood that modifications within the scope of the appended claims, may be made in the design and arrangement of the parts without departing from the spirit of the invention.

What is claimed is:

1. A rotary row weeding rake and crust breaker comprising longitudinally spaced transversely positioned parallel discs rigidly connected with pairs of rods, said rods being inclined to the longitudinal axis of rotation of the discs, bolts removably mounted in the discs spaced from and parallel to the rods, coils with tines extended from one of the ends thereof and loops extended from the opposite ends positioned on the bolts with the loops extended between the rods and with the tines extended radially from the bolts, a stub shaft extending from the disc at the leading end of the unit, and a stud extended from the disc on the trailing end of the unit.

2. A rotary row weeding rake and crust breaker comprising longitudinally spaced transversely positioned parallel discs rigidly connected with pairs of rods, said rods being inclined in relation to the longitudinal axis of the discs, bolts removably mounted in the discs spaced from and parallel to the rods, coils with tines extended from one of the ends thereof and loops extended from the opposite ends positioned on the bolts with the loops extended between the rods and with the tines extended radially from the bolts, said tines having hook-like elements on the extended ends thereof, a stub shaft extending from the disc at the leading end of the unit, and a stub extended from the disc on the trailing end of the unit.

References Cited in the file of this patent

UNITED STATES PATENTS

| | | |
|---|---|---|
| 323,164 | Laughlin | July 28, 1885 |
| 590,529 | McLaughlin | Sept. 21, 1897 |
| 653,095 | Klingele | July 3, 1900 |
| 1,733,153 | Hagglund | Oct. 29, 1929 |
| 2,090,973 | Basham | Aug. 24, 1937 |
| 2,377,104 | Rapaport | May 29, 1945 |
| 2,595,537 | Pitcher | May 6, 1952 |
| 2,641,981 | Pilsner | June 16, 1953 |